(12) United States Patent
Chang et al.

(10) Patent No.: US 11,502,795 B2
(45) Date of Patent: Nov. 15, 2022

(54) MULTI-USER DOWNLINK ORTHOGONAL FREQUENCY-DIVISION MULTIPLE ACCESS CONFIGURATION METHOD

(71) Applicant: MEDIATEK INC., Hsin-Chu (TW)

(72) Inventors: Yu-Hsien Chang, Hsinchu (TW); Ying-You Lin, Hsinchu (TW); Kuan-I Li, Hsinchu (TW); Ping-Chen Lin, Hsinchu (TW); Po-Hsun Wei, Hsinchu (TW); Cheng-Yi Chang, Hsinchu (TW)

(73) Assignee: MEDIATEK INC., Hsin-Chu (TW)

(*) Notice: Subject to any disclaimer, the term of this patent is extended or adjusted under 35 U.S.C. 154(b) by 86 days.

(21) Appl. No.: 17/013,683

(22) Filed: Sep. 7, 2020

(65) Prior Publication Data
US 2021/0075569 A1 Mar. 11, 2021

Related U.S. Application Data

(60) Provisional application No. 62/898,623, filed on Sep. 11, 2019.

(51) Int. Cl.
*H04W 56/00* (2009.01)
*H04L 5/00* (2006.01)
*H04L 1/00* (2006.01)
*H04W 72/04* (2009.01)

(52) U.S. Cl.
CPC .......... *H04L 5/0039* (2013.01); *H04L 1/0003* (2013.01); *H04W 72/0473* (2013.01); *H04L 5/0007* (2013.01)

(58) Field of Classification Search
CPC ... H04L 5/0039; H04L 1/0003; H04L 5/0007; H04W 72/0473
USPC .......................................................... 370/329
See application file for complete search history.

(56) References Cited

U.S. PATENT DOCUMENTS

| | | | |
|---|---|---|---|
| 10,219,271 B1* | 2/2019 | Hedayat | H04L 5/0055 |
| 2014/0086072 A1* | 3/2014 | Maaref | H04W 52/343 370/252 |
| 2015/0078179 A1 | 3/2015 | Lui | |
| 2015/0280953 A1* | 10/2015 | Porat | H04L 27/2627 370/330 |
| 2018/0007561 A1 | 1/2018 | Adachi | |
| 2018/0337811 A1* | 11/2018 | Ezri | H04L 27/264 |
| 2020/0228634 A1* | 7/2020 | Noh | H04W 74/006 |

* cited by examiner

*Primary Examiner* — Sai Ming Chan
(74) *Attorney, Agent, or Firm* — Winston Hsu

(57) ABSTRACT

A multi-user downlink orthogonal frequency-division multiple access (OFDMA) configuration method includes: assigning contiguous resource units (RUs) included in a channel to a plurality of stations, respectively; and assigning, by an access point (AP), one modulation and coding scheme (MCS) to each of the plurality of stations. Data rates of modulation and coding schemes that are assigned to first stations and associated with contiguous first RUs assigned to the first stations are monotonic, where the first stations are included in the plurality of stations.

19 Claims, 17 Drawing Sheets

MULTI-USER DOWNLINK ORTHOGONAL FREQUENCY-DIVISION MULTIPLE ACCESS CONFIGURATION METHOD

CROSS REFERENCE TO RELATED APPLICATIONS

This application claims the benefit of U.S. provisional application No. 62/898,623, filed on Sep. 11, 2019 and incorporated herein by reference.

BACKGROUND

The present invention relates to wireless communications, and more particularly, to a multi-user downlink orthogonal frequency-division multiple access (OFDMA) configuration method.

With rapid growth in the use of Wi-Fi in the enterprise and public venues, WiFi technology needed to evolve to meet the new requirements. The limited amount of unlicensed spectrum in both 2.4 GHz and 5 GHz bands means that each access point (AP) needs to concurrently serve more users in high-density scenarios. Recently, IEEE 802.11ax (also known as Wi-Fi 6), introducing the fundamental improvement of wireless local area networks (WLANs), has been approved as the next generation WLAN technology. Orthogonal frequency-division multiple access (OFDMA) is one of the most significant technical enhancements in IEEE 802.11ax. OFDMA is multi-user technology that enables simultaneous communication between one AP and multiple stations/users in a high efficiency WLAN. To maximize downlink throughput between AP and stations/users, the OFDMA configuration should be properly set by the AP to mitigate impact on the downlink throughput. For example, the downlink throughput degradation may result from transmit (TX) impairments (e.g., intermodulation, image rejection ratio, harmonic distortion, and spur) and/or receive (RX) impairments (e.g., thermal noise, intermodulation, image rejection ratio, phase noise, and spur). Thus, there is a need for an innovative multi-user downlink OFDMA configuration method that can properly assign modulation and coding schemes, transmission power levels, and/or resource unit sizes to optimize the downlink throughput.

SUMMARY

One of the objectives of the claimed invention is to provide a multi-user downlink orthogonal frequency-division multiple access (OFDMA) configuration method.

According to a first aspect of the present invention, an exemplary multi-user downlink orthogonal frequency-division multiple access (OFDMA) configuration method is disclosed. The exemplary multi-user downlink OFDMA configuration method includes: assigning contiguous resource units (RUs) included in a channel to a plurality of stations, respectively; and assigning, by an access point (AP), one modulation and coding scheme (MCS) to each of said plurality of stations, wherein data rates of modulation and coding schemes that are assigned to first stations and associated with contiguous first RUs assigned to the first stations are monotonic, where the first stations are included in said plurality of stations.

According to a second aspect of the present invention, an exemplary multi-user downlink orthogonal frequency-division multiple access (OFDMA) configuration method is disclosed. The exemplary multi-user downlink OFDMA configuration method includes: assigning contiguous resource units (RUs) included in a channel to a plurality of stations, respectively; and deciding, by an access point (AP), RU sizes of the contiguous RUs, wherein RU sizes of contiguous first RUs assigned to first stations are monotonic, where the first stations are included in said plurality of stations.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
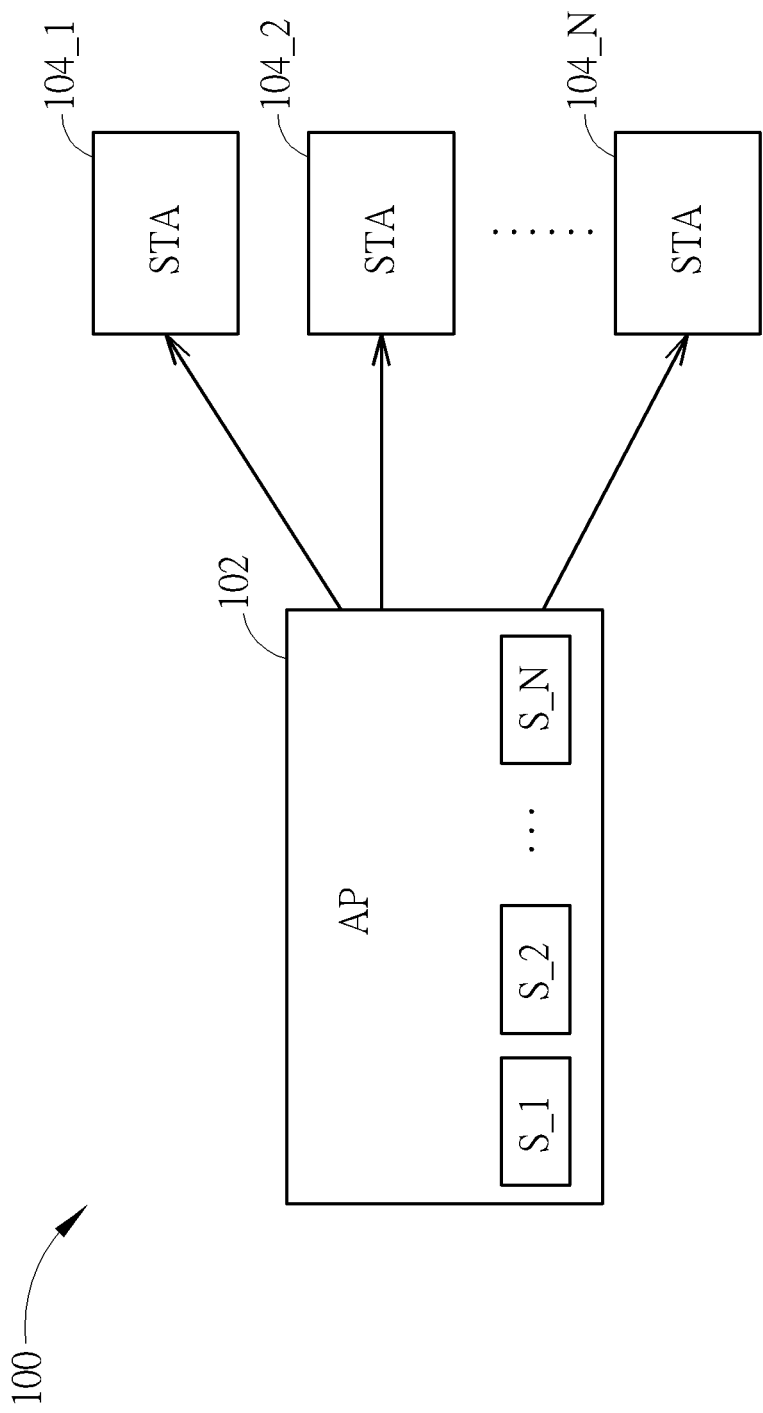
FIG. 1 is a diagram illustrating a wireless communication system according to an embodiment of the present invention.

FIG. 1 is a diagram illustrating a wireless communication system according to an embodiment of the present invention. The wireless communication system 100 may be a Wi-Fi system that adopts OFDMA for multi-user downlink. For example, the wireless communication system 100 may comply with IEEE 802.11ax. As shown in FIG. 1, the wireless communication system 100 includes an access point (AP) 102 and a plurality of stations (STAs) 104_1, 104_2, . . . , 104_N. The number N of stations involved in multi-user downlink OFDMA is a positive integer not smaller than 2. The AP 102 employs the proposed multi-user downlink OFDMA configuration method to configure downlink settings S_1, S_2, . . . , S_N used for communicating with the stations 104_1, 104_2, . . . , 104_N, respectively. For example, each of the downlink settings S_1-S_N may include a resource unit (RU) configuration, a modulation and coding scheme (MCS) setting, a transmission power level setting, or a combination thereof, where the RU configuration may include an RU size and/or an RU location. The proposed multi-user downlink OFDMA configuration method may apply setting constraints to at least one of RU size assignment, MCS assignment, and transmission power level assignment. For example, the setting constraints may include a monotonic function used for setting the downlink parameter (e.g., RU size, MCS, or transmission power) or a symmetric function used for setting the downlink parameter (e.g., RU size, MCS, or transmission power).

In accordance with IEEE 802.11ax, one packet can be used by multiple users with OFDMA that divides one 20/40/80/160 MHz channel into resource units (RUs). Each RU allocated in the 20/40/80/160 MHz channel is further divided into subcarriers, also called "tones", each being 78.125 KHz wide. Taking a 20 MHz channel for example, an RU can consist of 26, 52, 106, or 242 tones, where one 26-tone RU corresponds to an RU size of approximately 2 MHz, one 52-tone RU corresponds to an RU size of approximately 4 MHz, one 106-tone RU corresponds to an RU size of approximately 8 MHz, and one 242-tone RU corresponds to an RU size of approximately 20 MHz.

In accordance with the proposed multi-user downlink OFDMA configuration method, one packet is used by multiple users (e.g., stations 104_1-104_N) with OFDMA, and contiguous RUs included in a channel (e.g., 20 MHz channel, 40 MHz channel, 80 MHz channel, or 160 MHz channel) are assigned to the stations 104_1-104_N, respectively. By way of example, but not limitation, the AP 102 assigns a plurality of contiguous RUs {RU_1, RU_2, RU_3, RU_4, RU_5, RU_6, RU_7, RU_8, RU_9} included in a channel (e.g., 20/40/80/160 MHz channel) to different users {USR_1, USR_2, USR_3, USR_4, USR_5, USR_6, USR_7, USR_8, USR_9}, where each of the different users {USR_1, USR_2, USR_3, USR_4, USR_5, USR_6, USR_7, USR_8, USR_9} is one of the stations 104_1-104_N (N=9) each receiving only a portion of one packet that is transmitted from the AP 102 via the contiguous RUs {RU_1, RU_2, RU_3, RU_4, RU_5, RU_6, RU_7, RU_8, RU_9}. The contiguous RUs {RU_1, RU_2, RU_3, RU_4, RU_5, RU_6, RU_7, RU_8, RU_9} consist of contiguous sub-carriers included in the channel, where a frequency range occupied by RU_1 is lower than a frequency range occupied by RU_2, a frequency range occupied by RU_2 is lower than a frequency range occupied by RU_3, a frequency range occupied by RU_3 is lower than a frequency range occupied by RU_4, a frequency range occupied by RU_4 is lower than a frequency range occupied by RU_5, a frequency range occupied by RU 5 is lower than a frequency range occupied by RU_6, a frequency range occupied by RU 6 is lower than a frequency range occupied by RU_7, a frequency range occupied by RU_7 is lower than a frequency range occupied by RU_8, and a frequency range occupied by RU_8 is lower than a frequency range occupied by RU_9.

In a first exemplary design, the proposed multi-user downlink OFDMA configuration method applies setting constraints to MCS assignment. For example, the AP 102 assigns one MCS to each of the stations 104_1-104_N, where data rates of modulation and coding schemes that are assigned to the stations 104_1-104_N and associated with contiguous RUs assigned to the stations 104_1-104_N are monotonic, either monotonically increasing or monotonically decreasing.

Figure 2:
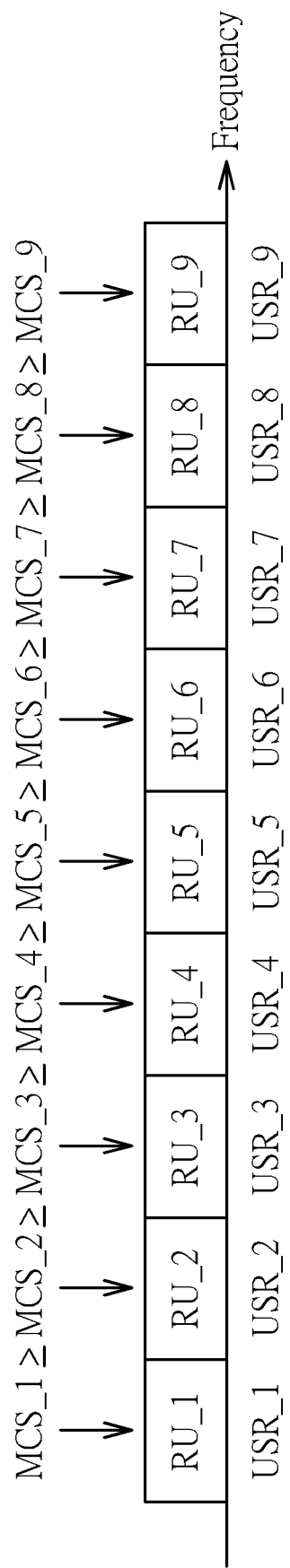
FIG. 2 is a diagram illustrating a first modulation and coding scheme (MCS) assignment scenario according to an embodiment of the present invention.

FIG. 2 is a diagram illustrating a first MCS assignment scenario according to an embodiment of the present invention. As mentioned above, the AP 102 assigns contiguous RUs {RU_1, RU_2, RU_3, RU_4, RU_5, RU_6, RU_7, RU_8, RU_9} included in a channel to different users {USR_1, USR_2, USR_3, USR_4, USR_5, USR_6, USR_7, USR_8, USR_9}, where each of the different users {USR_1, USR_2, USR_3, USR_4, USR_5, USR_6, USR_7, USR_8, USR_9} is one of the stations 104_1-104_N (N=9). For one transmission condition, the contiguous RUs {RU_1, RU_2, RU_3, RU_4, RU_5, RU_6, RU_7, RU_8, RU_9} may occupy the whole bandwidth of the channel. For another transmission condition, the contiguous RUs {RU_1, RU_2, RU_3, RU_4, RU_5, RU_6, RU_7, RU_8, RU_9} may occupy a partial bandwidth of the channel.

In this embodiment, the stations 104_1-104_N (N=9) may be all stations that are served by one downlink packet transmitted via the channel, and data rates of modulation and coding schemes {MCS_1, MCS_2, MCS_3, MCS_4, MCS_5, MCS_6, MCS_7, MCS_8, MCS_9} that are assigned to the users {USR_1, USR_2, USR_3, USR_4, USR_5, USR_6, USR_7, USR_8, USR_9} and associated with the contiguous RUs {RU_1, RU_2, RU_3, RU_4, RU_5, RU_6, RU_7, RU_8, RU_9} assigned to the users {USR 1, USR_2, USR_3, USR_4, USR_5, USR_6, USR_7, USR_8, USR_9} are monotonically decreasing. For example, each of modulation and coding schemes {MCS_1, MCS_2, MCS_3, MCS_4, MCS_5, MCS_6, MCS_7, MCS_8, MCS_9} is selected from a group consisting of MCS0-MCS11 as defined in IEEE 802.11ax, where MCS0 has the lowest data rate, and MCS11 has the highest data rate.

As shown in FIG. 2, the data rate of MCS_1 is a maximum among data rates of modulation and coding schemes {MCS_1, MCS_2, MCS_3, MCS_4, MCS_5, MCS_6, MCS_7, MCS_8, MCS_9}, the data rate of MCS_9 is a minimum among data rates of modulation and coding schemes {MCS_1, MCS_2, MCS_3, MCS_4, MCS_5, MCS_6, MCS_7, MCS_8, MCS_9}, the data rate of MCS_1 is not lower than the data rate of MCS_2, the data rate of MCS_2 is not lower than the data rate of MCS_3, the data rate of MCS_3 is not lower than the data rate of MCS_4, the data rate of MCS_4 is not lower than the data rate of MCS_5, the data rate of MCS_5 is not lower than the data rate of MCS_6, the data rate of MCS_6 is not lower than the data rate of MCS_7, the data rate of MCS_7 is not lower than the data rate of MCS_8, and the data rate of MCS_8 is not lower than the data rate of MCS_9.

In some embodiments of the present invention, the resource unit RU_1 shown in FIG. 2 may have the lowest frequency of the channel. For example, when MCS_1=MCS11, the MCS assignment scenario shown in FIG. 2 is employed, where the resource unit RU_1 has the lowest frequency of the channel.

Figure 3:
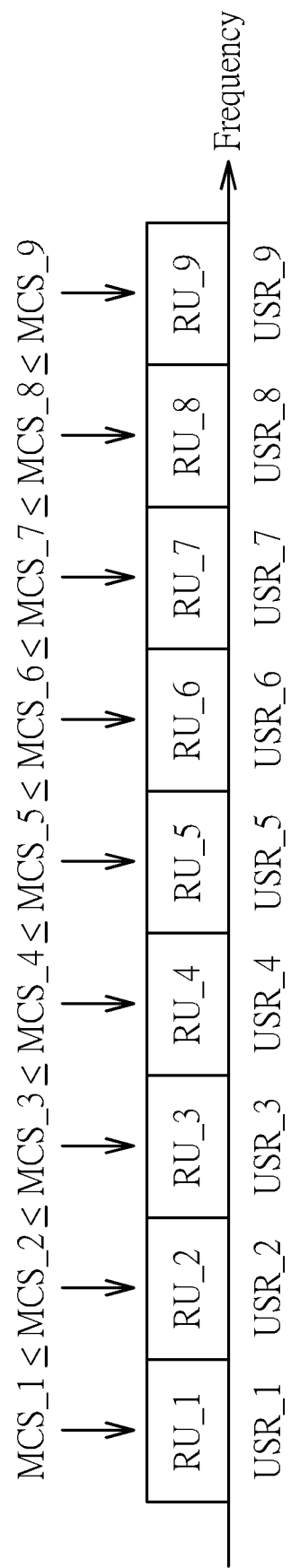
FIG. 3 is a diagram illustrating a second MCS assignment scenario according to an embodiment of the present invention.

FIG. 3 is a diagram illustrating a second MCS assignment scenario according to an embodiment of the present invention. As mentioned above, the AP 102 assigns contiguous RUs {RU_1, RU_2, RU_3, RU_4, RU_5, RU_6, RU_7, RU_8, RU_9} included in a channel to different users {USR_1, USR_2, USR_3, USR_4, USR_5, USR_6, USR_7, USR_8, USR_9}, where each of the different users {USR_1, USR_2, USR_3, USR_4, USR_5, USR_6, USR_7, USR_8, USR_9} is one of the stations 104_1-104_N (N=9). For one transmission condition, the contiguous RUs {RU_1, RU_2, RU_3, RU_4, RU_5, RU_6, RU_7, RU_8, RU_9} may occupy the whole bandwidth of the channel. For another transmission condition, the contiguous RUs {RU_1, RU_2, RU_3, RU_4, RU_5, RU_6, RU_7, RU_8, RU_9} may occupy a partial bandwidth of the channel.

In this embodiment, the stations 104_1-104_N (N=9) may be all stations that are served by one downlink packet transmitted via the channel, and data rates of modulation and coding schemes {MCS_1, MCS_2, MCS_3, MCS_4, MCS_5, MCS_6, MCS_7, MCS_8, MCS_9} that are assigned to the users {USR_1, USR_2, USR_3, USR_4, USR_5, USR_6, USR_7, USR_8, USR_9} and associated with the contiguous RUs {RU_1, RU_2, RU_3, RU_4, RU_5, RU_6, RU_7, RU_8, RU_9} assigned to the users {USR_1, USR_2, USR_3, USR_4, USR_5, USR_6, USR_7, USR_8, USR_9} are monotonically increasing. For example, each of modulation and coding schemes {MCS_1, MCS_2, MCS_3, MCS_4, MCS_5, MCS_6, MCS_7, MCS_8, MCS_9} is selected from a group consisting of MCS0-MCS11 as defined in IEEE 802.11ax, where MCS0 has the lowest data rate, and MCS11 has the highest data rate. Specifically, the data rate of MCS_1 is a minimum among data rates of modulation and coding schemes {MCS_1, MCS_2, MCS_3, MCS_4, MCS_5, MCS_6, MCS_7, MCS_8, MCS_9}, the data rate of MCS_9 is a maximum among data rates of modulation and coding schemes {MCS_1, MCS_2, MCS_3, MCS_4, MCS_5, MCS_6, MCS_7, MCS_8, MCS_9}, the data rate of MCS_1 is not higher than the data rate of MCS_2, the data rate of MCS_2 is not higher than the data rate of MCS_3, the data rate of MCS_3 is not higher than the data rate of MCS_4, the data rate of MCS_4 is not higher than the data rate of MCS_5, the data rate of MCS_5 is not higher than the data rate of MCS_6, the data rate of MCS_6 is not higher than the data rate of MCS_7, the data rate of MCS_7 is not higher than the data rate of MCS_8, and the data rate of MCS_8 is not higher than the data rate of MCS_9.

In some embodiments of the present invention, the resource unit RU_9 shown in FIG. 3 may have the highest frequency of the channel. For example, when MCS_9=MCS11, the MCS assignment scenario shown in FIG. 3 is employed, where the resource unit RU_9 has the highest frequency of the channel.

For another example, the AP 102 assigns one MCS to each of the stations 104_1-104_N, where stations 104_1-104_N include first stations and second stations, the first stations and the second stations have a common station, data rates of modulation and coding schemes that are assigned to the first stations and associated with contiguous first RUs assigned to the first stations are monotonically increasing, and data rates of modulation and coding schemes that are assigned to the second stations and associated with contiguous second RUs assigned to the second stations are monotonically decreasing. A data rate of a modulation and coding scheme assigned to the common station may be an extreme value (e.g., a maximum value or a minimum value) among modulation and coding schemes assigned to the stations 104_1-104_N.

Figure 4:
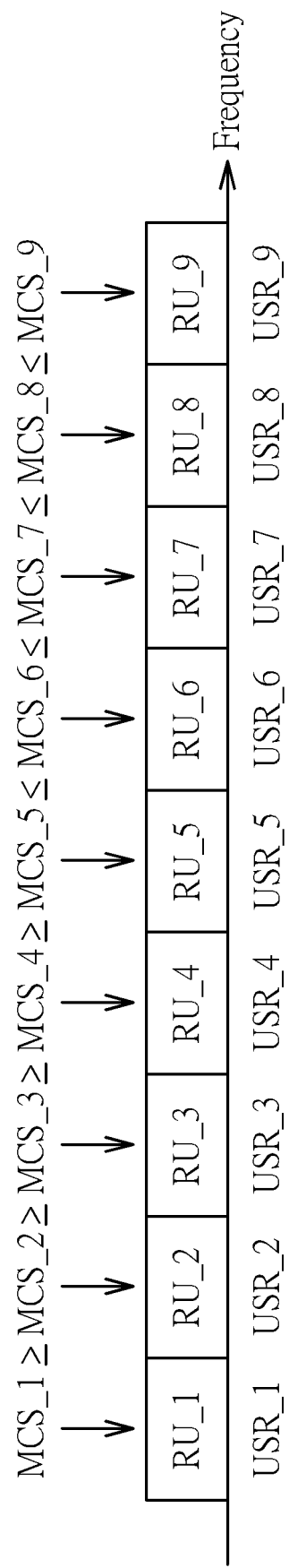
FIG. 4 is a diagram illustrating a third MCS assignment scenario according to an embodiment of the present invention.

FIG. 4 is a diagram illustrating a third MCS assignment scenario according to an embodiment of the present invention. As mentioned above, the AP 102 assigns contiguous RUs {RU_1, RU_2, RU_3, RU_4, RU_5, RU_6, RU_7, RU_8, RU_9} included in a channel to different users {USR_1, USR_2, USR_3, USR_4, USR_5, USR_6, USR_7, USR_8, USR_9}, where each of the different users {USR_1, USR_2, USR_3, USR_4, USR_5, USR_6, USR_7, USR_8, USR_9} is one of the stations 104_1-104_N (N=9). For one transmission condition, the contiguous RUs {RU_1, RU_2, RU_3, RU_4, RU_5, RU_6, RU_7, RU_8, RU_9} may occupy the whole bandwidth of the channel. For another transmission condition, the contiguous RUs {RU_1, RU_2, RU_3, RU_4, RU_5, RU_6, RU_7, RU_8, RU_9} may occupy a partial bandwidth of the channel.

In this embodiment, the stations 104_1-104_N (N=9) may be all stations that are served by one downlink packet transmitted via the channel, data rates of modulation and coding schemes {MCS_1, MCS_2, MCS_3, MCS_4, MCS_5} that are assigned to the users {USR_1, USR_2, USR_3, USR_4, USR_5} and associated with the contiguous RUs {RU_1, RU_2, RU_3, RU_4, RU_5} assigned to the users {USR_1, USR_2, USR_3, USR_4, USR_5} are monotonically decreasing, and data rates of modulation and coding schemes {MCS_5, MCS_6, MCS_7, MCS_8, MCS_9} that are assigned to the users {USR_5, USR_6, USR_7, USR_8, USR_9} and associated with the contiguous RUs {RU_5, RU_6, RU_7, RU_8, RU_9} assigned to the users {USR_5, USR_6, USR_7, USR_8, USR_9} are monotonically increasing. For example, each of modulation and coding schemes {MCS_1, MCS_2, MCS_3, MCS_4, MCS_5, MCS_6, MCS_7, MCS_8, MCS_9} is selected from a group consisting of MCS0-MCS11 as defined in IEEE 802.11ax, where MCS0 has the lowest data rate, and MCS11 has the highest data rate. Specifically, the data rate of MCS_5 is a minimum among data rates of modulation and coding schemes {MCS_1, MCS_2, MCS_3, MCS_4, MCS_5, MCS_6, MCS_7, MCS_8, MCS_9}, the data rate of MCS_1 is not lower than the data rate of MCS_2, the data rate of MCS_2 is not lower than the data rate of MCS_3, the data rate of MCS_3 is not lower than the data rate of MCS_4, the data rate of MCS_4 is not lower than the data rate of MCS_5, the data rate of MCS_5 is not higher than the data rate of MCS_6, the data rate of MCS_6 is not higher than the data rate of MCS_7, the data rate of MCS_7 is not higher than the data rate of MCS_8, and the data rate of MCS_8 is not higher than the data rate of MCS_9.

In some embodiments of the present invention, the resource unit RU_9 shown in FIG. 4 may not have the highest frequency of the channel and the resource unit RU_1 shown in FIG. 4 may not have the lowest frequency of the channel, if data rate of MCS_5≤data rate of MCS9. For example, the MCS assignment scenario shown in FIG. 4 is employed when data rate of MCS_5≤data rate of MCS6.

Figure 5:
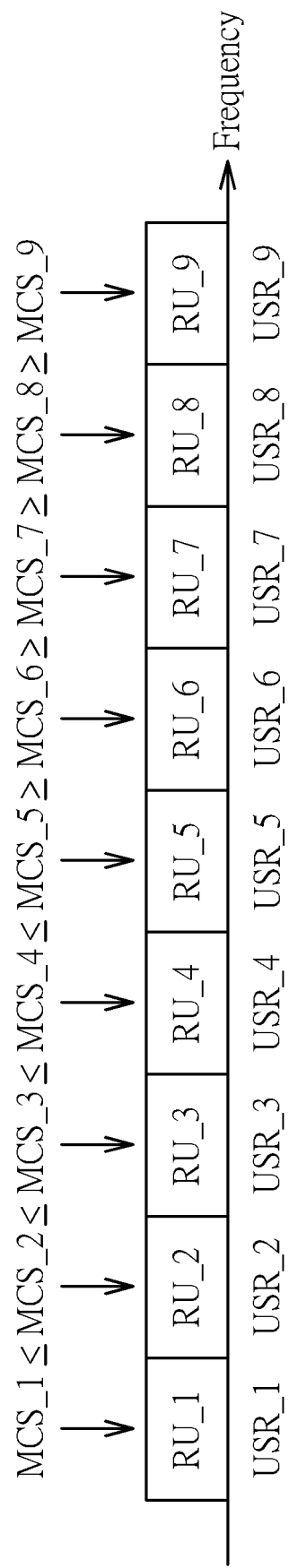
FIG. 5 is a diagram illustrating a fourth MCS assignment scenario according to an embodiment of the present invention.

FIG. 5 is a diagram illustrating a fourth MCS assignment scenario according to an embodiment of the present invention. As mentioned above, the AP 102 assigns contiguous RUs {RU_1, RU_2, RU_3, RU_4, RU_5, RU_6, RU_7, RU_8, RU_9} included in a channel to different users {USR_1, USR_2, USR_3, USR_4, USR_5, USR_6, USR_7, USR_8, USR_9}, where each of the different users {USR_1, USR_2, USR_3, USR_4, USR_5, USR_6, USR_7, USR_8, USR_9} is one of the stations 104_1-104_N (N=9). For one transmission condition, the contiguous RUs {RU_1, RU_2, RU_3, RU_4, RU_5, RU_6, RU_7, RU_8, RU_9} may occupy the whole bandwidth of the channel. For another transmission condition, the contiguous RUs {RU_1, RU_2, RU_3, RU_4, RU_5, RU_6, RU_7, RU_8, RU_9} may occupy a partial bandwidth of the channel.

In this embodiment, the stations 104_1-104_N (N=9) may be all stations that are served by one downlink packet transmitted via the channel, data rates of modulation and coding schemes {MCS_1, MCS_2, MCS_3, MCS_4, MCS_5} that are assigned to the users {USR_1, USR_2, USR_3, USR_4, USR_5} and associated with the contiguous RUs {RU_1, RU_2, RU_3, RU_4, RU_5} assigned to the users {USR_1, USR_2, USR_3, USR_4, USR_5} are monotonically increasing, and data rates of modulation and coding schemes {MCS_5, MCS_6, MCS_7, MCS_8, MCS_9} that are assigned to the users {USR_5, USR_6, USR_7, USR_8, USR_9} and associated with the contiguous RUs {RU_5, RU_6, RU_7, RU_8, RU_9} assigned to the users {USR_5, USR_6, USR_7, USR_8, USR_9} are monotonically decreasing. For example, each of modulation and coding schemes {MCS_1, MCS_2, MCS_3, MCS_4, MCS_5, MCS_6, MCS_7, MCS_8, MCS_9} is selected from a group consisting of MCS0-MCS11 as defined in IEEE 802.11ax, where MCS0 has the lowest data rate, and MCS11 has the highest data rate. Specifically, the data rate of MCS_5 is a maximum among data rates of modulation and coding schemes {MCS_1, MCS_2, MCS_3, MCS_4, MCS_5, MCS_6, MCS_7, MCS_8, MCS_9}, the data rate of MCS_1 is not higher than the data rate of MCS_2, the data rate of MCS_2 is not higher than the data rate of MCS_3, the data rate of MCS_3 is not higher than the data rate of MCS_4, the data rate of MCS_4 is not higher than the data rate of MCS_5, the data rate of MCS_5 is not lower than the data rate of MCS_6, the data rate of MCS_6 is not lower than the data rate of MCS_7, the data rate of MCS_7 is not lower than the data rate of MCS_8, and the data rate of MCS_8 is not lower than the data rate of MCS_9.

In some embodiments of the present invention, the resource unit RU_9 shown in FIG. 5 may not have the highest frequency of the channel and the resource unit RU_1 shown in FIG. 5 may not have the lowest frequency of the channel, if data rate of MCS_5≤data rate of MCS9. For example, the MCS assignment scenario shown in FIG. 5 is employed when data rate of MCS_5>data rate of MCS6.

In a second exemplary design, the proposed multi-user downlink OFDMA configuration method applies setting constraints to RU size assignment, where a RU size of an RU is the number of sub-carriers (tones) included in the RU. For example, the AP 102 decides RU sizes of contiguous RUs assigned to the stations 104_1-104_N, where the RU sizes of contiguous RUs are monotonic.

Figure 6:
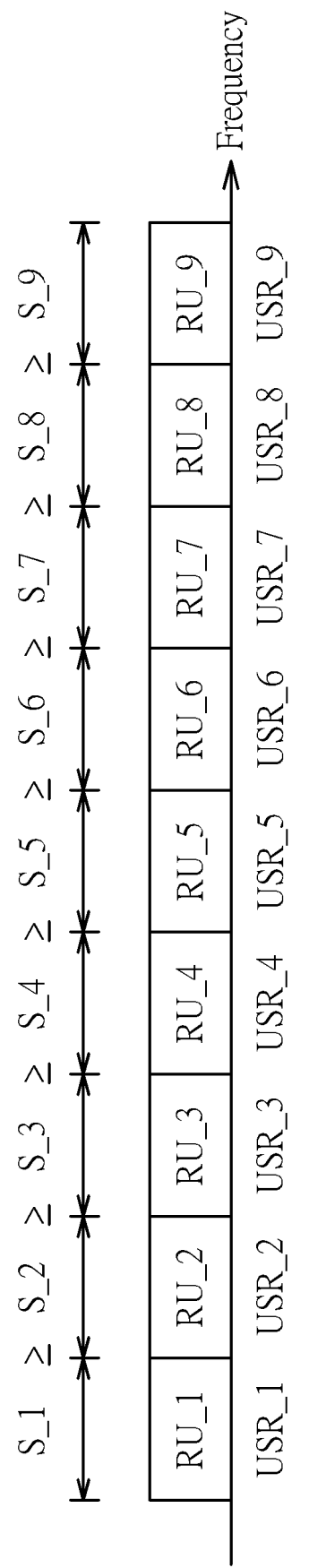
FIG. 6 is a diagram illustrating a first resource unit (RU) size assignment scenario according to an embodiment of the present invention.

FIG. 6 is a diagram illustrating a first RU size assignment scenario according to an embodiment of the present invention. As mentioned above, the AP 102 assigns contiguous RUs {RU_1, RU_2, RU_3, RU_4, RU_5, RU_6, RU_7, RU_8, RU_9} included in a channel to different users {USR_1, USR_2, USR_3, USR_4, USR_5, USR_6, USR_7, USR_8, USR_9}, where each of the different users {USR_1, USR_2, USR_3, USR_4, USR_5, USR_6, USR_7, USR_8, USR_9} is one of the stations 104_1-104_N (N=9). For one transmission condition, the contiguous RUs {RU_1, RU_2, RU_3, RU_4, RU_5, RU_6, RU_7, RU_8, RU_9} may occupy the whole bandwidth of the channel. For another transmission condition, the contiguous RUs {RU_1, RU_2, RU_3, RU_4, RU_5, RU_6, RU_7, RU_8, RU_9} may occupy a partial bandwidth of the channel.

In this embodiment, the stations 104_1-104_N (N=9) may be all stations that are served by one downlink packet transmitted via the channel, and RU sizes {S_1, S_2, S_3, S_4, S_5, S_6, S_7, S_8, S_9} of the contiguous RUs {RU_1, RU_2, RU_3, RU_4, RU_5, RU_6, RU_7, RU_8, RU_9} assigned to the users {USR_1, USR_2, USR_3, USR_4, USR_5, USR_6, USR_7, USR_8, USR_9} are monotonically decreasing. Specifically, the RU size S_1 of RU_1 is a maximum among RU sizes {S_1, S_2, S_3, S_4, S_5, S_6, S_7, S_8, S_9}, the RU size of RU_9 is a minimum among RU sizes {S_1, S_2, S_3, S_4, S_5, S_6, S_7, S_8, S_9}, the RU size S_1 of RU_1 is not smaller than the RU size S_2 of RU_2, the RU size S_2 of RU_2 is not smaller than the RU size S_3 of RU_3, the RU size S_3 of RU_3 is not smaller than the RU size S_4 of RU_4, the RU size S_4 of RU_4 is not smaller than the RU size S_5 of RU_5, the RU size S_5 of RU_5 is not smaller than the RU size S_6 of RU_6, the RU size S_6 of RU_6 is not smaller than the RU size S_7 of RU_7, the RU size S_7 of RU_7 is not smaller than the RU size S_8 of RU_8, and the RU size S_8 of RU_8 is not smaller than the RU size S_9 of RU_9.

Figure 7:
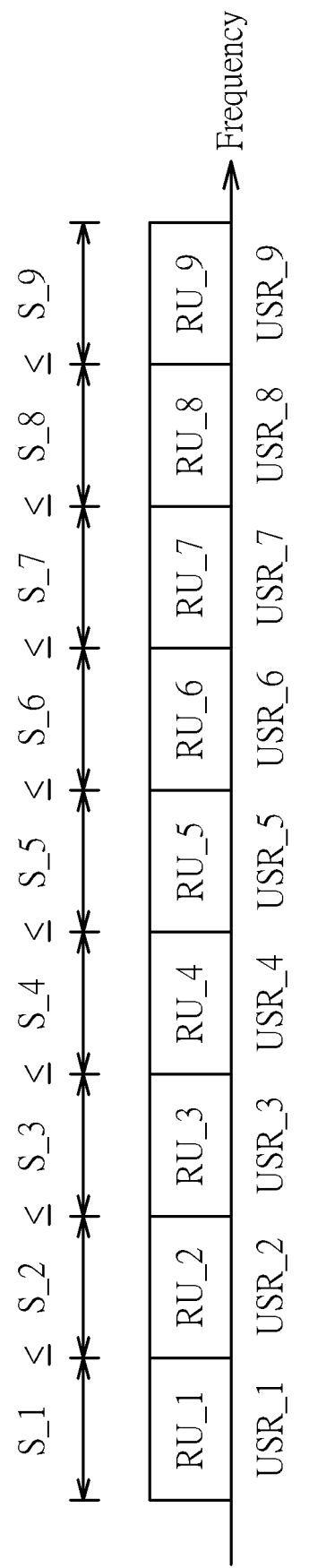
FIG. 7 is a diagram illustrating a second RU size assignment scenario according to an embodiment of the present invention.

FIG. 7 is a diagram illustrating a second RU size assignment scenario according to an embodiment of the present invention. As mentioned above, the AP 102 assigns contiguous RUs {RU_1, RU_2, RU_3, RU_4, RU_5, RU_6, RU_7, RU_8, RU_9} included in a channel to different users {USR_1, USR_2, USR_3, USR_4, USR_5, USR_6, USR_7, USR_8, USR_9}, where each of the different users {USR_1, USR_2, USR_3, USR_4, USR_5, USR_6, USR_7, USR_8, USR_9} is one of the stations 104_1-104_N (N=9). For one transmission condition, the contiguous RUs {RU_1, RU_2, RU_3, RU_4, RU_5, RU_6, RU_7, RU_8, RU_9} may occupy the whole bandwidth of the channel. For another transmission condition, the contiguous RUs {RU_1, RU_2, RU_3, RU_4, RU_5, RU_6, RU_7, RU_8, RU_9} may occupy a partial bandwidth of the channel.

In this embodiment, the stations 104_1-104_N (N=9) may be all stations that are served by one downlink packet transmitted via the channel, and RU sizes {S_1, S_2, S_3, S_4, S_5, S_6, S_7, S_8, S_9} of the contiguous RUs {RU_1, RU_2, RU_3, RU_4, RU_5, RU_6, RU_7, RU_8, RU_9} assigned to the users {USR_1, USR_2, USR_3, USR_4, USR_5, USR_6, USR_7, USR_8, USR_9} are monotonically increasing. Specifically, the RU size S_1 of RU_1 is a minimum among RU sizes {S_1, S_2, S_3, S_4, S_5, S_6, S_7, S_8, S_9}, the RU size S_9 of RU_9 is a maximum among RU sizes RU sizes {S_1, S_2, S_3, S_4, S_5, S_6, S_7, S_8, S_9}, the RU size S_1 of RU_1 is not larger than the RU size S_2 of RU_2, the RU size of RU_2 is not larger than the RU size S_3 of RU_3, the RU size S_3 of RU_3 is not larger than the RU size of RU_4, the RU size S_4 of RU_4 is not larger than the RU size S_5 of RU_5, the RU size S_5 of RU_5 is not larger than the RU size S_6 of RU_6, the RU size S_6 of RU_6 is not larger than the RU size S_7 of RU_7, the RU size S_7 of RU_7 is not larger than the RU size S_8 of RU_8, and the RU size S_8 of RU_8 is not larger than the RU size of RU_9.

For another example, the AP 102 decides RU sizes assigned to the stations 104_1-104_N, where stations 104_1-104_N include first stations and second stations, the first stations and the second stations have a common station, the RU sizes of contiguous first RUs assigned to the first stations are monotonically increasing, and the RU sizes of contiguous second RUs assigned to the second stations are monotonically decreasing.

Figure 8:
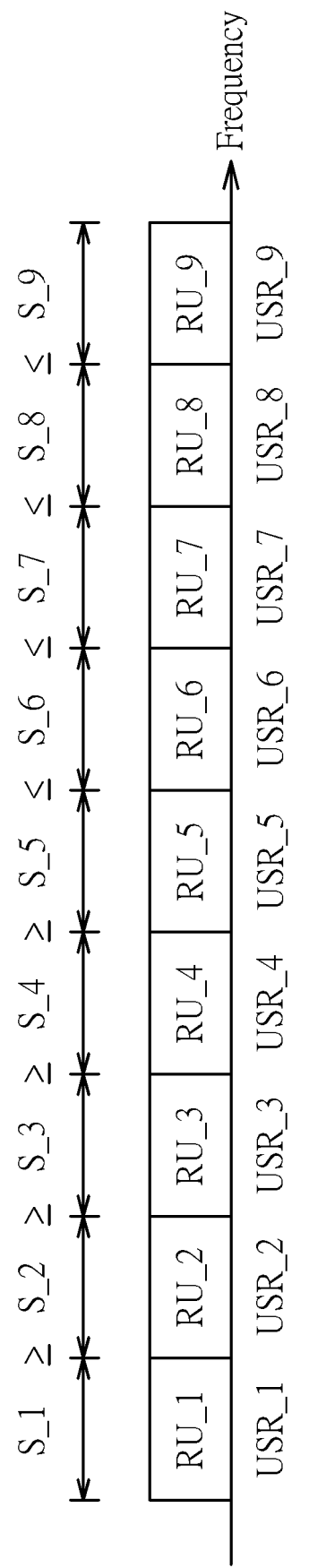
FIG. 8 is a diagram illustrating a third RU size assignment scenario according to an embodiment of the present invention.

FIG. 8 is a diagram illustrating a third RU size assignment scenario according to an embodiment of the present invention. As mentioned above, the AP 102 assigns contiguous RUs {RU_1, RU_2, RU_3, RU_4, RU_5, RU_6, RU_7, RU_8, RU_9} included in a channel to different users {USR_1, USR_2, USR_3, USR_4, USR_5, USR_6, USR_7, USR_8, USR_9}, where each of the different users {USR_1, USR_2, USR_3, USR_4, USR_5, USR_6, USR_7, USR_8, USR_9} is one of the stations 104_1-104_N (N=9). For one transmission condition, the contiguous RUs {RU_1, RU_2, RU_3, RU_4, RU_5, RU_6, RU_7, RU_8, RU_9} may occupy the whole bandwidth of the channel. For another transmission condition, the contiguous RUs {RU_1, RU_2, RU_3, RU_4, RU_5, RU_6, RU_7, RU_8, RU_9} may occupy a partial bandwidth of the channel.

In this embodiment, the stations 104_1-104_N (N=9) may be all stations that are served by one downlink packet transmitted via the channel, RU sizes {S_1, S_2, S_3, S_4, S_5} of the contiguous RUs {RU_1, RU_2, RU_3, RU_4, RU_5} assigned to the users {USR_1, USR_2, USR_3, USR_4, USR_5} are monotonically decreasing, and RU sizes {S_5, S_6, S_7, S_8, S_9} of the contiguous RUs {RU_5, RU_6, RU_7, RU_8, RU_9} assigned to the users {USR_5, USR_6, USR_7, USR_8, USR_9} are monotonically increasing. Specifically, the RU size S_5 of RU_5 is a minimum among RU sizes {RU_1, RU_2, RU_3, RU_4, RU_5, RU_6, RU_7, RU_8, RU_9}, the RU size S_1 of RU_1 is not smaller than the RU size S_2 of RU_2, the RU size S_2 of RU_2 is not smaller than the RU size S_3 of RU_3, the RU size S_3 of RU_3 is not smaller than the RU size S_4 of RU_4, the RU size S_4 of RU_4 is not smaller than the RU size of RU_5, the RU size S_5 of RU_5 is not larger than the RU size S_6 of RU_6, the RU size S_6 of RU_6 is not larger than the RU size S_7 of RU_7, the RU size S_7 of RU_7 is not larger than the RU size S_8 of RU_8, and the RU size S_8 of RU_8 is not larger than the RU size S_9 of RU_9.

Figure 9:
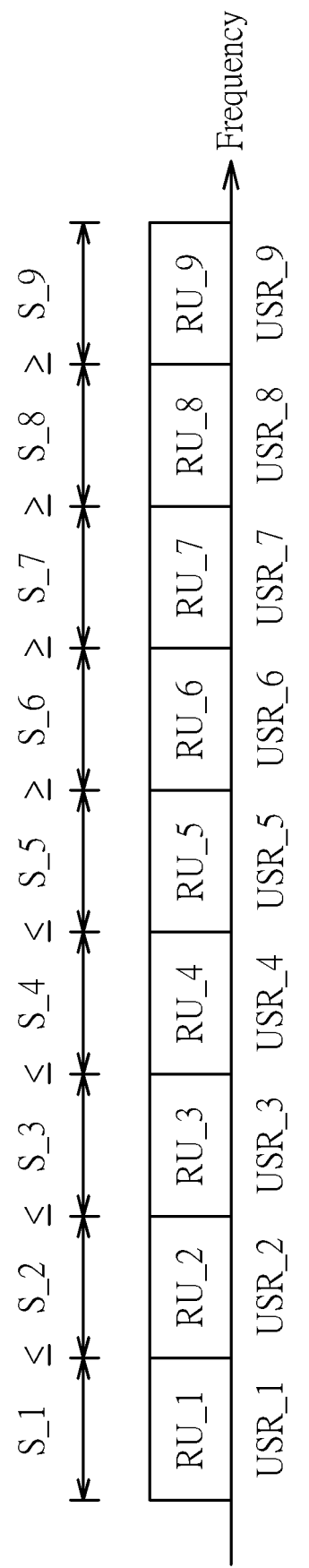
FIG. 9 is a diagram illustrating a fourth RU size assignment scenario according to an embodiment of the present invention.

FIG. 9 is a diagram illustrating a fourth RU size assignment scenario according to an embodiment of the present invention. As mentioned above, the AP 102 assigns contiguous RUs {RU_1, RU_2, RU_3, RU_4, RU_5, RU_6, RU_7, RU_8, RU_9} included in a channel to different users {USR_1, USR_2, USR_3, USR_4, USR_5, USR_6, USR_7, USR_8, USR_9}, where each of the different users {USR_1, USR_2, USR_3, USR_4, USR_5, USR_6, USR_7, USR_8, USR_9} is one of the stations 104_1-104_N (N=9). For one transmission condition, the contiguous RUs {RU_1, RU_2, RU_3, RU_4, RU_5, RU_6, RU_7, RU_8, RU_9} may occupy the whole bandwidth of the channel. For another transmission condition, the contiguous RUs {RU_1, RU_2, RU_3, RU_4, RU_5, RU_6, RU_7, RU_8, RU_9} may occupy a partial bandwidth of the channel.

In this embodiment, the stations 104_1-104_N (N=9) may be all stations that are served by one downlink packet transmitted via the channel, RU sizes {S_1, S_2, S_3, S_4, S_5} of the contiguous RUs {RU_1, RU_2, RU_3, RU_4, RU_5} assigned to the users {USR_1, USR_2, USR_3, USR_4, USR_5} are monotonically increasing, and RU sizes {S_5, S_6, S_7, S_8, S_9} of the contiguous RUs {RU_5, RU_6, RU_7, RU_8, RU_9} assigned to the users {USR_5, USR_6, USR_7, USR_8, USR_9} are monotonically decreasing. Specifically, the RU size S_5 of RU_5 is a maximum among RU sizes {S_1, S_2, S_3, S_4, S_5, S_6, S_7, S_8, S_9}, the RU size S_1 of RU_1 is not larger than the RU size S_2 of RU_2, the RU size S_2 of RU_2 is not larger than the RU size of RU_3, the RU size S_3 of RU_3 is not larger than the RU size S_4 of RU_4, the RU size S_4 of RU_4 is not larger than the RU size S_5 of RU_5, the RU size S_5 of RU_5 is not smaller than the RU size S_6 of RU_6, the RU size S_6 of RU_6 is not smaller than the RU size S_7 of RU_7, the RU size S_7 of RU_7 is not smaller than the RU size S_8 of RU_8, and the RU size S_8 of RU_8 is not smaller than the RU size of RU_9.

In a third exemplary design, the proposed multi-user downlink OFDMA configuration method applies setting constraints to transmission power assignment. For example, the AP 102 decides one transmission power level for downlink of each of the stations 104_1-104_N, where transmission power levels that are decided for downlink of the stations 104_1-104_N and associated with contiguous RUs assigned to the stations 104_1-104_N are monotonic.

Figure 10:
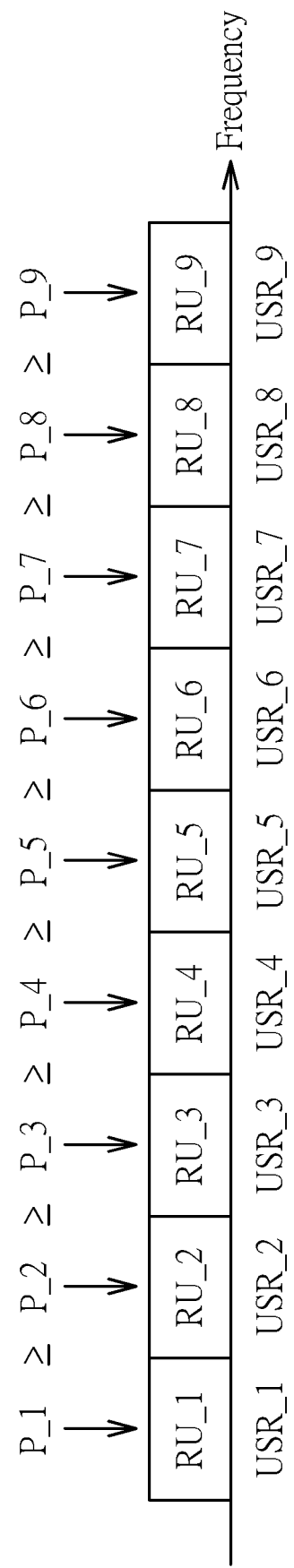
FIG. 10 is a diagram illustrating a first transmission power assignment scenario according to an embodiment of the present invention.

FIG. 10 is a diagram illustrating a first transmission power assignment scenario according to an embodiment of the present invention. As mentioned above, the AP 102 assigns contiguous RUs {RU_1, RU_2, RU_3, RU_4, RU_5, RU_6, RU_7, RU_8, RU_9} included in a channel to different users {USR_1, USR_2, USR_3, USR_4, USR_5, USR_6, USR_7, USR_8, USR_9}, where each of the different users {USR_1, USR_2, USR_3, USR_4, USR_5, USR_6, USR_7, USR_8, USR_9} is one of the stations 104_1-104_N (N=9). For one transmission condition, the contiguous RUs {RU_1, RU_2, RU_3, RU_4, RU_5, RU_6, RU_7, RU_8, RU_9} may occupy the whole bandwidth of the channel. For another transmission condition, the contiguous RUs {RU_1, RU_2, RU_3, RU_4, RU_5, RU_6, RU_7, RU_8, RU_9} may occupy a partial bandwidth of the channel.

In this embodiment, the stations 104_1-104_N (N=9) may be all stations that are served by one downlink packet transmitted via the channel, and transmission power levels {P_1, P_2, P_3, P_4, P_5, P_6, P_7, P_8, P_9} that are decided for the contiguous RUs {RU_1, RU_2, RU_3, RU_4, RU_5, RU_6, RU_7, RU_8, RU_9} assigned to the users {USR_1, USR_2, USR_3, USR_4, USR_5, USR_6, USR_7, USR_8, USR_9} are monotonically decreasing. Specifically, the transmission power level P_1 of RU_1 is a maximum among transmission power levels {P_1, P_2, P_3, P_4, P_5, P_6, P_7, P_8, P_9}, the transmission power level of RU_9 is a minimum among transmission power levels {P_1, P_2, P_3, P_4, P_5, P_6, P_7, P_8, P_9}, the transmission power level P_1 of RU_1 is not lower than the transmission power level P_2 of RU_2, the transmission power level of RU_2 is not lower than the transmission power level P_3 of RU_3, the transmission power level P_3 of RU_3 is not lower than the transmission power level of RU_4, the transmission power level P_4 of RU_4 is not lower than the transmission power level P_5 of RU_5, the transmission power level P_5 of RU_5 is not lower than the transmission power level P_6 of RU_6, the transmission power level P_6 of RU_6 is not lower than the transmission power level P_7 of RU_7, the transmission power level P_7 of RU_7 is not lower than the transmission power level P_8 of RU_8, and the transmission power level P_8 of RU_8 is not lower than the transmission power level P_9 of RU_9.

In some embodiments of the present invention, the resource unit RU_9 shown in FIG. 10 may have the highest frequency of the channel. For example, when the modulation and coding scheme assigned to the resource unit RU_9 is MCS11, the transmission power assignment scenario shown in FIG. 10 is employed, where the resource unit RU_9 has the highest frequency of the channel.

Figure 11:
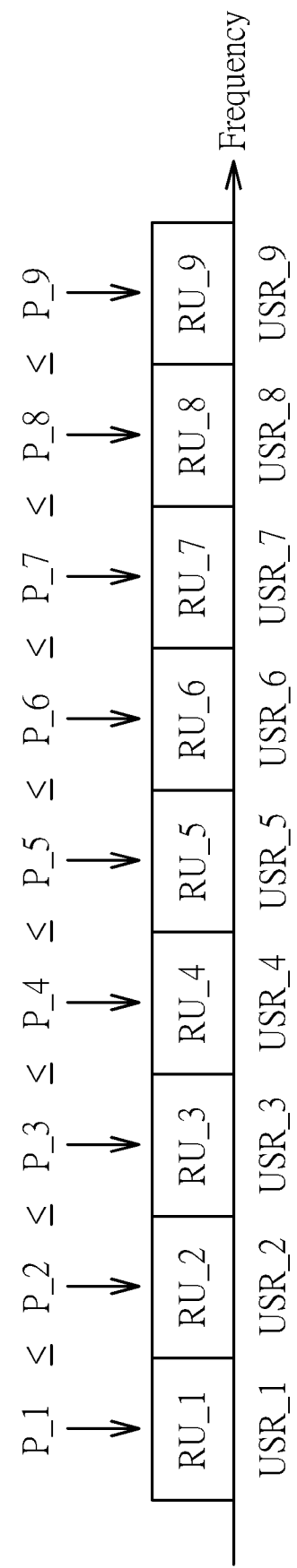
FIG. 11 is a diagram illustrating a second transmission power assignment scenario according to an embodiment of the present invention.

FIG. 11 is a diagram illustrating a second transmission power assignment scenario according to an embodiment of the present invention. As mentioned above, the AP 102 assigns contiguous RUs {RU_1, RU_2, RU_3, RU_4, RU_5, RU_6, RU_7, RU_8, RU_9} included in a channel to different users {USR_1, USR_2, USR_3, USR_4, USR_5, USR_6, USR_7, USR_8, USR_9}, where each of the different users {USR_1, USR_2, USR_3, USR_4, USR_5, USR_6, USR_7, USR_8, USR_9} is one of the stations 104_1-104_N (N=9). For one transmission condition, the contiguous RUs {RU_1, RU_2, RU_3, RU_4, RU_5, RU_6, RU_7, RU_8, RU_9} may occupy the whole bandwidth of the channel. For another transmission condition, the contiguous RUs {RU_1, RU_2, RU_3, RU_4, RU_5, RU_6, RU_7, RU_8, RU_9} may occupy a partial bandwidth of the channel.

In this embodiment, the stations 104_1-104_N (N=9) may be all stations that are served by one downlink packet transmitted via the channel, and transmission power levels {P_1, P_2, P_3, P_4, P_5, P_6, P_7, P_8, P_9} that are decided for the contiguous RUs {RU_1, RU_2, RU_3, RU_4, RU_5, RU_6, RU_7, RU_8, RU_9} assigned to the users {USR_1, USR_2, USR_3, USR_4, USR_5, USR_6, USR_7, USR_8, USR_9} are monotonically increasing. Specifically, the transmission power level P_1 of RU_1 is a minimum among transmission power levels {P_1, P_2, P_3, P_4, P_5, P_6, P_7, P_8, P_9}, the transmission power level P_9 of RU_9 is a maximum among transmission power levels {P_1, P_2, P_3, P_4, P_5, P_6, P_7, P_8, P_9}, the transmission power level P_1 of RU_1 is not higher than the transmission power level P_2 of RU_2, the transmission power level P_2 of RU_2 is not higher than the transmission power level P_3 of RU_3, the transmission power level P_3 of RU_3 is not higher than the transmission power level P_4 of RU_4, the transmission power level P_4 of RU_4 is not higher than the transmission power level P_5 of RU_5, the transmission power level P_5 of RU_5 is not higher than the transmission power level P_6 of RU_6, the transmission power level P_6 of RU_6 is not higher than the transmission power level P_7 of RU_7, the transmission power level P_7 of RU_7 is not higher than the transmission power level P_8 of RU_8, and the transmission power level P_8 of RU_8 is not higher than the transmission power level P_9 of RU_9.

In some embodiments of the present invention, the resource unit RU_1 shown in FIG. 11 may have the lowest frequency of the channel. For example, when the modulation and coding scheme assigned to the resource unit RU_1 is MCS11, the transmission power assignment scenario shown in FIG. 11 is employed, where the resource unit RU_1 has the lowest frequency of the channel.

For another example, the AP 102 decides one transmission power level for downlink of each of the stations 104_1-104_N, where stations 104_1-104_N include first stations and second stations, the first stations and the second stations have a common station, transmission power levels that are decided for contiguous first RUs assigned to the first stations are monotonically increasing, and transmission power levels that are decided for contiguous second RUs assigned to the second stations are monotonically decreasing.

Figure 12:
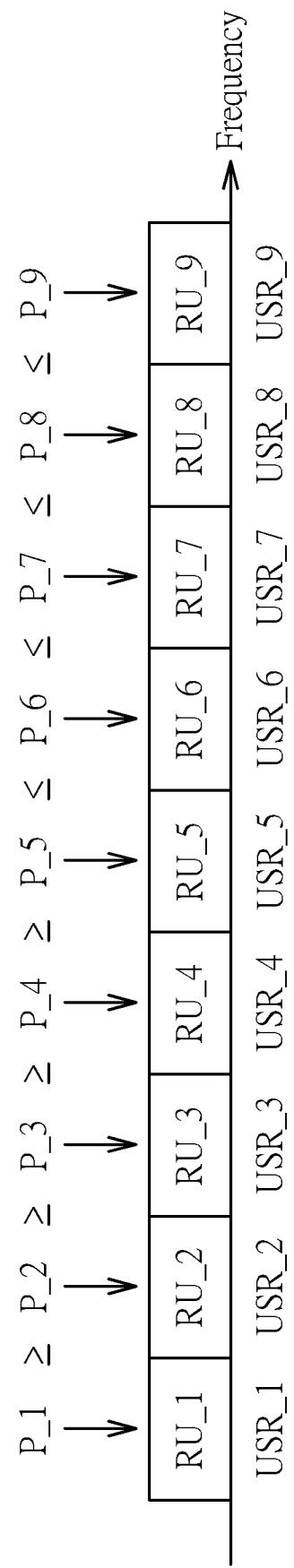
FIG. 12 is a diagram illustrating a third transmission power assignment scenario according to an embodiment of the present invention.

FIG. 12 is a diagram illustrating a third transmission power assignment scenario according to an embodiment of the present invention. As mentioned above, the AP 102 assigns contiguous RUs {RU_1, RU_2, RU_3, RU_4, RU_5, RU_6, RU_7, RU_8, RU_9} included in a channel to different users {USR_1, USR_2, USR_3, USR_4, USR_5, USR_6, USR_7, USR_8, USR_9}, where each of the different users {USR_1, USR_2, USR_3, USR_4, USR_5, USR_6, USR_7, USR_8, USR_9} is one of the stations 104_1-104_N (N=9). For one transmission condition, the contiguous RUs {RU_1, RU_2, RU_3, RU_4, RU_5, RU_6, RU_7, RU_8, RU_9} may occupy the whole bandwidth of the channel. For another transmission condition, the contiguous RUs {RU_1, RU_2, RU_3, RU_4, RU_5, RU_6, RU_7, RU_8, RU_9} may occupy a partial bandwidth of the channel.

In this embodiment, the stations 104_1-104_N (N=9) may be all stations that are served by one downlink packet transmitted via the channel, transmission power levels {P_1, P_2, P_3, P_4, P_5} that are decided for the contiguous RUs {RU_1, RU_2, RU_3, RU_4, RU_5} assigned to the users {USR_1, USR_2, USR_3, USR_4, USR_5} are monotonically decreasing, and transmission power levels {P_5, P_6, P_7, P_8, P_9} that are decided for the contiguous RUs {RU_5, RU_6, RU_7, RU_8, RU_9} assigned to the users {USR_5, USR_6, USR_7, USR_8, USR_9} are monotonically increasing. Specifically, the transmission power level P_5 of RU_5 is a minimum among transmission power levels {P_1, P_2, P_3, P_4, P_5, P_6, P_7, P_8, P_9}, the transmission power level P_1 of RU_1 is not lower than the transmission power level P_2 of RU_2, the transmission power level P_2 of RU_2 is not lower than the transmission power level P_3 of RU_3, the transmission power level P_3 of RU_3 is not lower than the transmission power level P_4 of RU_4, the transmission power level P_4 of RU_4 is not lower than the transmission power level P_5 of RU_5, the transmission power level P_5 of RU_5 is not higher than the transmission power level P_6 of RU_6, the transmission power level P_6 of RU_6 is not higher than the transmission power level P_7 of RU_7, the transmission power level P_7 of RU_7 is not higher than the transmission power level P_8 of RU_8, and the transmission power level P_8 of RU_8 is not higher than the transmission power level P_9 of RU_9.

In some embodiments of the present invention, the resource unit RU_9 shown in FIG. 12 may not have the highest frequency of the channel and the resource unit RU_1 shown in FIG. 12 may not have the lowest frequency of the channel, if the maximum data rate is not higher than data rate of MCS9. For example, the transmission power assignment scenario shown in FIG. 12 is employed when data rate of modulation and coding scheme assigned to RU_5 is higher than data rate of MCS6.

Figure 13:
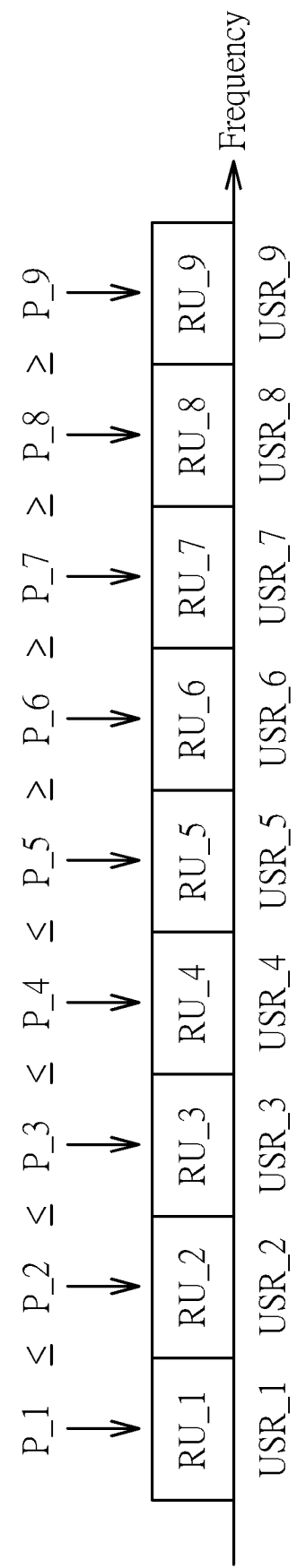
FIG. 13 is a diagram illustrating a fourth transmission power assignment scenario according to an embodiment of the present invention.
Figure 14:
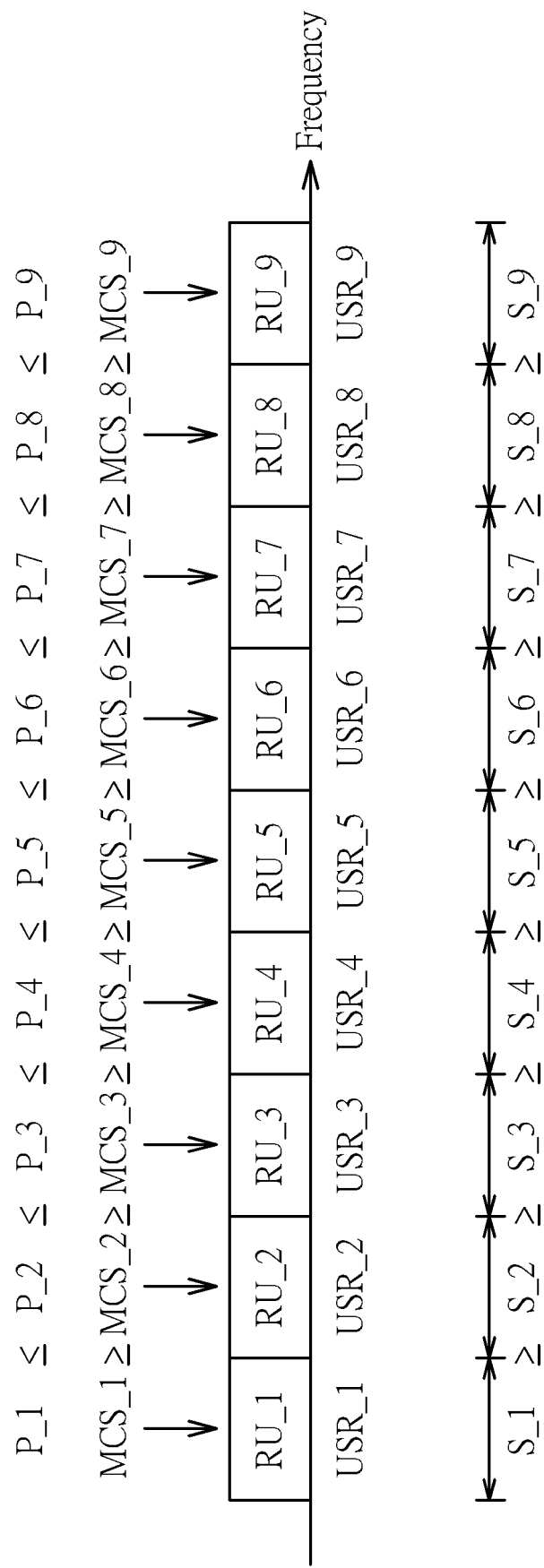
FIG. 14 is a diagram illustrating a first multi-user downlink orthogonal frequency-division multiple access (OFDMA) configuration with setting constraints applied to RU size assignment, MCS assignment, and transmission power assignment according to an embodiment of the present invention.
Figure 15:
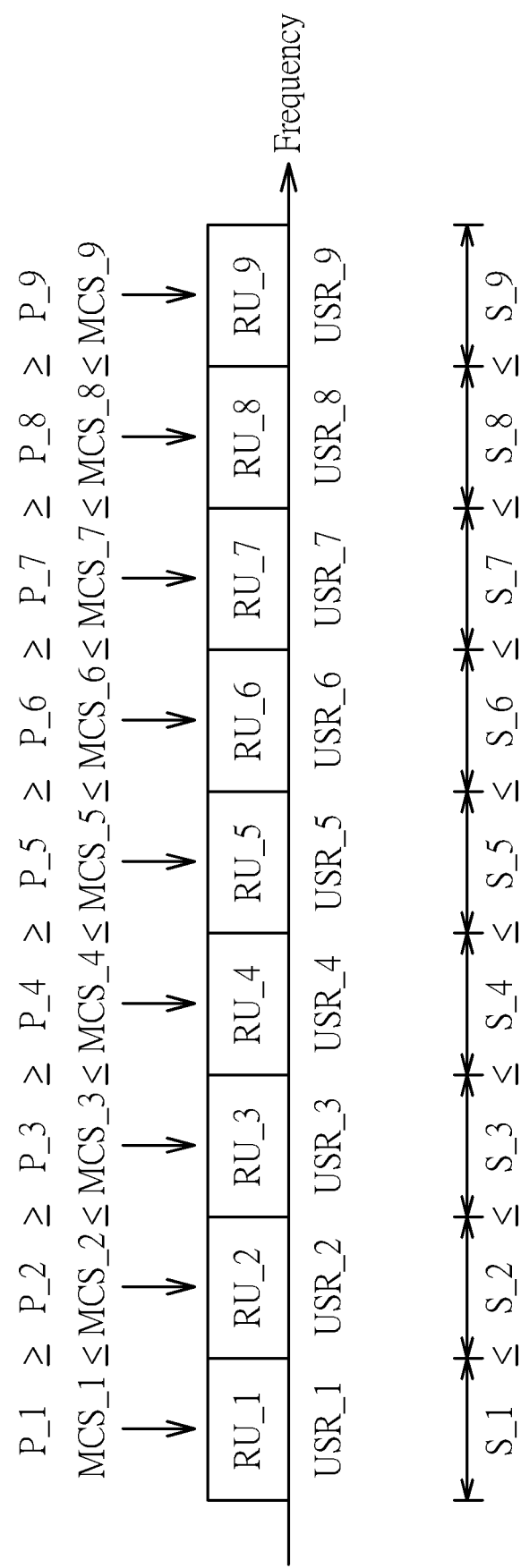
FIG. 15 is a diagram illustrating a second multi-user downlink OFDMA configuration with setting constraints applied to RU size assignment, MCS assignment, and transmission power assignment according to an embodiment of the present invention.
Figure 16:
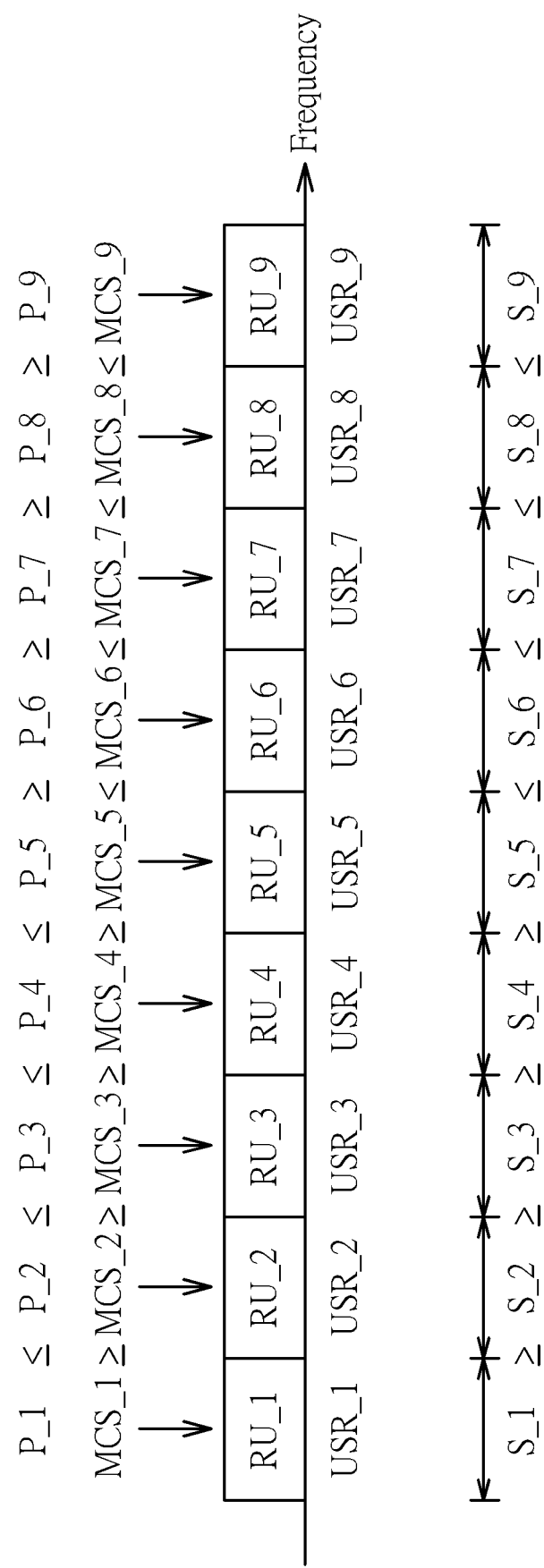
FIG. 16 is a diagram illustrating a third multi-user downlink OFDMA configuration with setting constraints applied to RU size assignment, MCS assignment, and transmission power assignment according to an embodiment of the present invention.
Figure 17:
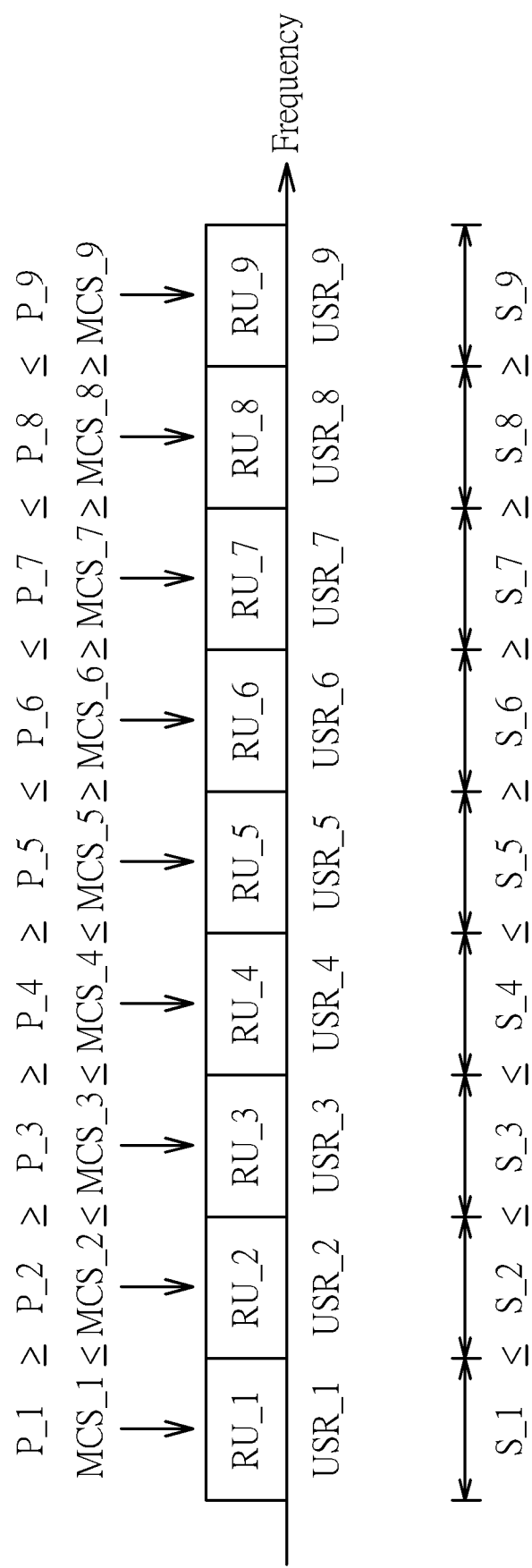
FIG. 17 is a diagram illustrating a fourth multi-user downlink OFDMA configuration with setting constraints applied to RU size assignment, MCS assignment, and transmission power assignment according to an embodiment of the present invention.

FIG. 13 is a diagram illustrating a fourth transmission power assignment scenario according to an embodiment of the present invention. As mentioned above, the AP 102 assigns contiguous RUs {RU_1, RU_2, RU_3, RU_4, RU_5, RU_6, RU_7, RU_8, RU_9} included in a channel to different users {USR_1, USR_2, USR_3, USR_4, USR_5, USR_6, USR_7, USR_8, USR_9}, where each of the different users {USR_1, USR_2, USR_3, USR_4, USR_5, USR_6, USR_7, USR_8, USR_9} is one of the stations 104_1-104_N (N=9). For one transmission condition, the contiguous RUs {RU_1, RU_2, RU_3, RU_4, RU_5, RU_6, RU_7, RU_8, RU_9} may occupy the whole bandwidth of the channel. For another transmission condition, the contiguous RUs {RU_1, RU_2, RU_3, RU_4, RU_5, RU_6, RU_7, RU_8, RU_9} may occupy a partial bandwidth of the channel.

In this embodiment, the stations 104_1-104_N (N=9) may be all stations that are served by one downlink packet transmitted via the channel, transmission power levels {P_1, P_2, P_3, P_4, P_5} that are decided for contiguous RUs {RU_1, RU_2, RU_3, RU_4, RU_5} assigned to the users {USR_1, USR_2, USR_3, USR_4, USR_5} are monotonically increasing, and transmission power levels {P_5, P_6, P_7, P_8, P_9} that are decided for contiguous RUs {RU_5, RU_6, RU_7, RU_8, RU_9} assigned to the users {USR_5, USR_6, USR_7, USR_8, USR_9} are monotonically decreasing. Specifically, the transmission power level P_5 of RU_5 is a maximum among transmission power levels {P_1, P_2, P_3, P_4, P_5, P_6, P_7, P_8, P_9}, the transmission power level P_1 of RU_1 is not higher than the transmission power level P_2 of RU_2, the transmission power level P_2 of RU_2 is not higher than the transmission power level P_3 of RU_3, the transmission power level P_3 of RU_3 is not higher than the transmission power level P_4 of RU_4, the transmission power level P_4 of RU_4 is not higher than the transmission power level P_5 of RU_5, the transmission power level P_5 of RU_5 is not lower than the transmission power level P_6 of RU_6, the transmission power level P_6 of RU_6 is not lower than the transmission power level P_7 of RU_7, the transmission power level P_7 of RU_7 is not lower than the transmission power level P_8 of RU_8, and the transmission power level P_8 of RU_8 is not lower than the transmission power level P_9 of RU_9.

In some embodiments of the present invention, the resource unit RU_9 shown in FIG. 13 may not have the highest frequency of the channel and the resource unit RU_1 shown in FIG. 13 may not have the lowest frequency of the channel, if the maximum data rate is not higher than data rate of MCS9. For example, the transmission power assignment scenario shown in FIG. 13 is employed when data rate of modulation and coding scheme assigned to RU_5 is not higher than data rate of MCS6.

In above embodiments shown in FIGS. 2-5, the proposed multi-user downlink OFDMA configuration method applies setting constraints to RU size assignment. In above embodiments shown in FIGS. 6-9, the proposed multi-user downlink OFDMA configuration method applies setting constraints to MCS assignment. In above embodiments shown in FIGS. 10-13, the proposed multi-user downlink OFDMA configuration method applies setting constraints to transmission power assignment. However, these are for illustrative purposes only, and are not meant to be limitations of the present invention. In practice, the proposed multi-user downlink OFDMA configuration method may apply setting constraints to any combination of RU size assignment, MCS assignment, and transmission power assignment.

FIGS. 14-17 are diagrams illustrating different multi-user downlink OFDMA configurations with setting constraints applied to RU size assignment, MCS assignment, and transmission power assignment according to embodiments of the present invention. Since a person skilled in the art can readily understand details of the embodiments shown in FIGS. 14-17 after reading above paragraphs, further description is omitted here for brevity. Furthermore, the multi-user downlink OFDMA configurations shown in FIGS. 14-17 are for illustrative purposes only, and are not meant to be limitations of the present invention. Any multi-user downlink OFDMA configuration using proposed setting constraints of RU size assignment, MCS assignment, and transmission power assignment falls within the scope of the present invention.

For example, data rates of modulation and coding schemes that are assigned to stations (which are served by one packet transmitted via the channel) and associated with contiguous RUs assigned to the stations are monotonic, transmission power levels decided for the contiguous RUs assigned to the stations (which are served by one packet transmitted via the channel) are monotonic, and RU sizes of the contiguous RUs assigned to the stations (which are served by one packet transmitted via the channel) are monotonic.

For another example, data rates of modulation and coding schemes that are assigned to first stations (which are some of stations served by one packet transmitted via the channel) and associated with contiguous RUs assigned to the first stations are monotonically increasing, and data rates of modulation and coding schemes that are assigned to second stations (which are some of stations served by one packet transmitted via the channel) and associated with contiguous RUs assigned to the second stations are monotonically decreasing, where the first stations and the second stations have a common station; transmission power levels decided for the contiguous RUs assigned to third stations (which are some of stations served by one packet transmitted via the channel) are monotonically increasing, and transmission power levels decided for the contiguous RUs assigned to fourth stations (which are some of stations served by one packet transmitted via the channel) are monotonically decreasing, where the third stations and the fourth stations have a common station; and RU sizes of the contiguous RUs assigned to fifth stations (which are some of stations served by one packet transmitted via the channel) are monotonically increasing, and RU sizes of the contiguous RUs assigned to sixth stations (which are some of stations served by one packet transmitted via the channel) are monotonically decreasing, where the fifth stations and the sixth stations have a common station. The grouping of the first stations and the second stations may be same or different from the grouping of the third stations and the fourth stations, depending upon actual design considerations. The grouping of the first stations and the second stations may be same or different from the grouping of the fifth stations and the sixth stations, depending upon actual design considerations. The grouping of the third stations and the fourth stations may be same or different from the grouping of the fifth stations and the sixth stations, depending upon actual design considerations.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A multi-user downlink orthogonal frequency-division multiple access (OFDMA) configuration method comprising:
assigning contiguous resource units (RUs) included in a channel to a plurality of stations, respectively; and
assigning, by an access point (AP), one modulation and coding scheme (MCS) to each of said plurality of stations, wherein data rates of modulation and coding schemes that are assigned to first stations and associated with contiguous first RUs assigned to the first stations are monotonic, where the first stations are included in said plurality of stations.

2. The multi-user downlink OFDMA configuration method of claim 1, wherein the first stations are all of said plurality of stations that utilize the channel for downlink transmission of one packet.

3. The multi-user downlink OFDMA configuration method of claim 2, further comprising:
deciding one transmission power level for downlink of each of said plurality of stations;
wherein transmission power levels that are decided for the contiguous RUs assigned to said plurality of stations are monotonic.

4. The multi-user downlink OFDMA configuration method of claim 2, further comprising:
deciding RU sizes of the contiguous RUs assigned to said plurality of stations, wherein the RU sizes of the contiguous RUs are monotonic.

5. The multi-user downlink OFDMA configuration method of claim 2, wherein the contiguous RUs comprise an RU having a lowest frequency of the channel.

6. The multi-user downlink OFDMA configuration method of claim 2, wherein the contiguous RUs comprise an RU having a highest frequency of the channel.

7. The multi-user downlink OFDMA configuration method of claim 1, wherein said plurality of stations include second stations, the first stations and the second stations have a common station, the data rates of modulation and coding schemes that are assigned to the first stations and associated with the contiguous first RUs assigned to the first stations are monotonically increasing, and data rates of modulation and coding schemes that are assigned to the second stations and associated with contiguous second RUs assigned to the second stations are monotonically decreasing.

8. The multi-user downlink OFDMA configuration method of claim 7, further comprising:
deciding one transmission power level for downlink of each of said plurality of stations;
wherein said plurality of stations include third stations and fourth stations, the third stations and the fourth stations have a common station, transmission power levels that are decided for contiguous RUs assigned to the third stations are monotonically increasing, and transmission power levels that are decided for contiguous RUs assigned to the fourth stations are monotonically decreasing.

9. The multi-user downlink OFDMA configuration method of claim 7, further comprising:
deciding RU sizes of the contiguous RUs, wherein said plurality of stations include third stations and fourth stations, the third stations and the fourth stations have a common station, RU sizes of contiguous RUs assigned to the third stations are monotonically increasing, and RU sizes of contiguous RUs assigned to the fourth stations are monotonically decreasing.

10. The multi-user downlink OFDMA configuration method of claim 7, wherein frequencies occupied by the contiguous second RUs are not higher than frequencies occupied by the contiguous first RUs, and a data rate of an MCS assigned to the common station is a minimum among modulation and coding schemes assigned to said plurality of stations.

11. The multi-user downlink OFDMA configuration method of claim 7, wherein frequencies occupied by the contiguous first RUs are not higher than frequencies occupied by the contiguous second RUs, and a data rate of an MCS assigned to the common station is a maximum among modulation and coding schemes assigned to said plurality of stations.

12. A multi-user downlink orthogonal frequency-division multiple access (OFDMA) configuration method comprising:
assigning contiguous resource units (RUs) included in a channel to a plurality of stations, respectively;
deciding, by an access point (AP), RU sizes of the contiguous RUs, wherein RU sizes of contiguous first RUs assigned to first stations are monotonic, where the first stations are included in said plurality of stations; and
deciding one transmission power level for downlink of each of said plurality of stations;
wherein transmission power levels that are decided for the contiguous RUs assigned to said first stations are monotonic.

13. The multi-user downlink OFDMA configuration method of claim 12, wherein the first stations are all of said plurality of stations that utilize the channel for downlink transmission of one packet.

14. The multi-user downlink OFDMA configuration method of claim 13, wherein the contiguous RUs comprise an RU having a lowest frequency of the channel.

15. The multi-user downlink OFDMA configuration method of claim 13, wherein the contiguous RUs comprise an RU having a highest frequency of the channel.

16. The multi-user downlink OFDMA configuration method of claim 12, wherein said plurality of stations include second stations, the first stations and the second stations have a common station, the RU sizes of the contiguous first RUs assigned to the first stations are monotonically increasing, and RU sizes of contiguous second RUs assigned to the second stations are monotonically decreasing.

17. The multi-user downlink OFDMA configuration method of claim 16,
wherein said plurality of stations include third stations and fourth stations, the third stations and the fourth stations have a common station, transmission power levels that are decided for contiguous RUs assigned to the third stations are monotonically increasing, and transmission power levels that are decided for contiguous RUs assigned to the fourth stations are monotonically decreasing.

18. The multi-user downlink OFDMA configuration method of claim 16, wherein frequencies occupied by the contiguous second RUs are not higher than frequencies occupied by the contiguous first RUs, and an RU size of an RU assigned to the common station is a minimum among RU sizes of RUs assigned to said plurality of stations.

19. The multi-user downlink OFDMA configuration method of claim 16, wherein frequencies occupied by the contiguous first RUs are not higher than frequencies occupied by the contiguous second RUs, and an RU size of an RU assigned to the common station is a maximum among RU sizes of RUs assigned to said plurality of stations.

\* \* \* \* \*